United States Patent [19]

Cameron

[11] Patent Number: 4,935,163
[45] Date of Patent: Jun. 19, 1990

[54] HIGH SERVICE TEMPERATURE CONDUCTIVE POLYMERS AND METHOD OF PRODUCING SAME

[75] Inventor: Randy E. Cameron, Pacific Palisades, Calif.

[73] Assignee: Lockheed Corporation, Calabasas, Calif.

[21] Appl. No.: 226,484

[22] Filed: Aug. 1, 1988

[51] Int. Cl.$^5$ .................. H01B 1/00; C08G 73/00
[52] U.S. Cl. ................ 252/500; 528/422; 525/540
[58] Field of Search ............ 252/500; 528/397, 422; 524/81, 157, 158, 159; 525/540

[56] References Cited

U.S. PATENT DOCUMENTS

| 4,466,911 | 8/1984 | House | 528/397 |
| 4,505,845 | 3/1985 | House | 252/518 |
| 4,798,685 | 1/1989 | Yaniger | 252/500 |
| 4,806,271 | 2/1989 | Yaniger et al. | 528/422 |

Primary Examiner—Josephine Barr
Attorney, Agent, or Firm—Max Geldin

[57] ABSTRACT

Production of base-type conductive polymers, particularly from the family of conductive polyaniline, by reacting a base-type non-conductive polymer containing carbon-nitrogen linkages, e.g., polyaniline, with a multiprotic acid in the form of an aromatic multisulfonic acid, such as m-benzene disulfonic acid, and forming an electrically conductive polymer having high thermal stability at elevated temperature, e.g., 180° C. in air.

21 Claims, 1 Drawing Sheet

HIGH SERVICE TEMPERATURE CONDUCTIVE POLYMERS AND METHOD OF PRODUCING SAME

BACKGROUND OF THE INVENTION

This invention relates to the production of electrically conductive polymer materials and is particularly concerned with the production of such materials exhibiting high thermal stability, and with procedure for producing same.

The free-base form of polyaniline, that is, polyaniline free of acid groups, is believed to comprise subunits having the formula:

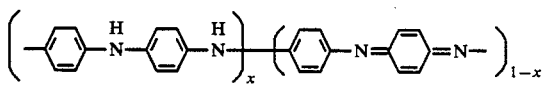

where x is between 0 and 1. The oxidation state of polyaniline referred to as "emeraldine" is believed to have a value of x of about 0.5.

The free-base form of polyaniline is electrically non-conductive. Protonic acid doping of polyaniline by reaction of polyaniline with a protonic acid HX where X is, for example, Cl, to produce electrically conductive polyaniline is known, for example, as disclosed in A. G. MacDiarmid, et al, Mol. Cryst. Liq. Cryst. 121, 173 (1985). Conductive polyaniline of this type has been employed in batteries, as disclosed, for example, in French Pat. No. 1,519,729.

However, a number of difficulties have been encountered with such prior art electrically conductive materials. Some of these problems were addressed in U. S. Applications Ser. No. 920,474 filed Oct. 20, 1986, of S. I. Yaniger, now U.S. Pat. No. 4,798,685, and Ser. No. 013,305 filed Feb. 11, 1987, of S. I. Yaniger, et al, now U.S. Pat. No. 4,806,271, both assigned to the same assignee as the present application. In these applications, it is disclosed that Lewis acids, for example, alkylating agents, can be used to make the insulating emeraldine free-base into a conductive polymer salt. Use of proper Lewis acids resulted in conductive polyanilines with the Lewis acid as a sidechain.

Thus, in the above U. S. application, Ser. No. 920,474, a base-type non-conductive polymer, such as polyaniline, can be reacted with, for example, methyl iodide, to form an electrically conductive polymer in which the methyl group is covalently linked to the nitrogen atoms of the polymer.

In the above U. S. application, Ser. No. 013,305, emeraldine free-base can be reacted with reagents of the form $RS_2Cl$, e.g., tosyl chloride, to form an electrically conductive polymer in which the $—SO_2R$ cation groups are covalently linked to the nitrogen atoms of the polymer.

However, polymers of the above applications exhibit loss of conductivity when exposed to high temperatures. For example, the conductive polymer produced by emeraldine free-base treated with tosyl chloride (conductivity =1.0 S/cm) loses its conductivity when heated to 150° C. for one hour. The thermal instability results from interaction of the relatively nucleophilic chloride counterion with the amine bound hydrogens of the polymer backbone.

An object of the present invention is the provision of improved base-type electrically conductive polymers of the class of conductive polyaniline.

Another object is to provide conductive polymers, such as conductive polyaniline, having thermally stable counterions in the conductive polymer system.

Still another object is the provision of a conductive base-type polymer of the above type, such as conductive polyaniline, having groups which are thermally stable and remain bound to the nitrogen atoms of the polymer even at high temperatures and which increase the oxidative stability of the polymer backbone.

Yet another object is to provide novel procedure for producing the above conductive polymers.

SUMMARY OF THE INVENTION

The above objects are achieved, according to the invention, to produce highly thermally stable electrically conductive polymers, by reacting a base-type non-conductive polymer containing carbon-nitrogen linkages, particularly from the family of the polyanilines, as described in greater detail below, with an effective amount sufficient to increase electrical conductivity of a multiprotic acid in the form of an aromatic multisulfonic acid, such as m-benzene disulfonic acid, and forming an electrically conductive polymer in which sulfonic acid groups are linked to the nitrogen atoms of the polymer.

Thus, base-type non-conductive polymers, particularly as represented by the free-base polyaniline, or emeraldine, can be reacted with a multisulfonic acid having the formula $R(SO_3H)_n$, where R is aryl and n is an integer of 2 or more, or mixtures thereof, as defined more fully below, to form a polymer salt in which the $—SO_3H$ groups are covalently linked to the nitrogens of the polymer through the hydrogen bond. Thus, the term "base-type conductive" polymers employed herein is intended to denote the polymer salts formed by the above reaction.

The result is a more thermally stable conducting polymer. Due to the high thermal stability and low volatility of the multiprotic acids employed, such acids bind to the polymer, e.g., polyaniline, even at very high temperatures, and the oxidative stability of the polymer backbone is increased by this bond.

DETAILED DESCRIPTION OF THE INVENTION AND PRFERRED EMBODIMENTS

Figure 1:
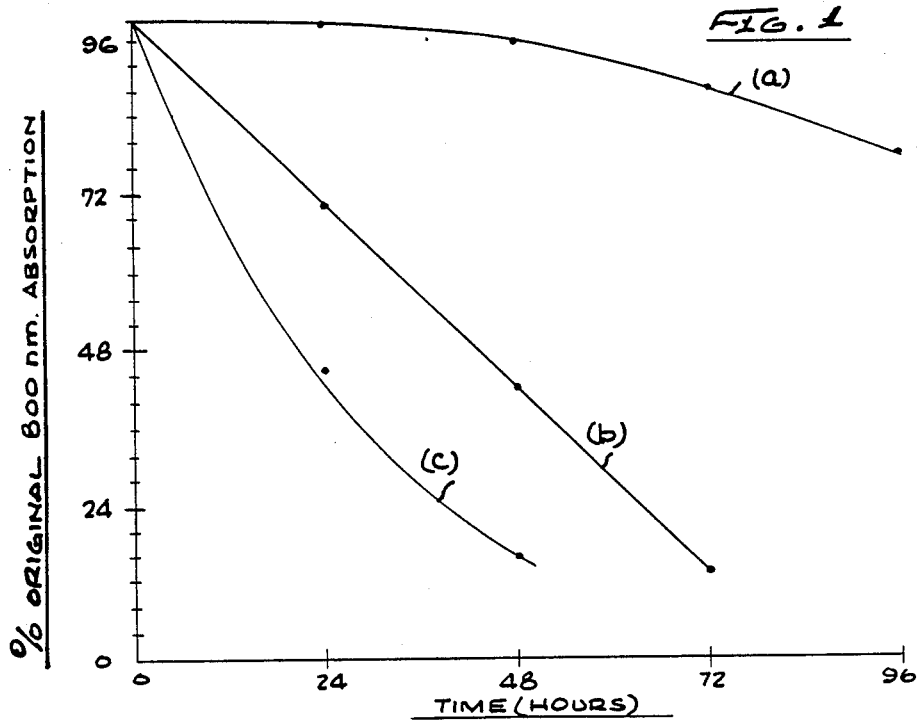
FIG. 1 of the drawings is a plot showing the relative decomposition rates for polyaniline derivatized with m-benzene disulfonic acid in comparison with other derivatizing agents, at 180° C. in air.

The base-type conductive polymers of the invention are prepared by the reaction of a base-type non-conductive polymer containing the carbon-nitrogen linkage with an aromatic multisulfonic acid. The base-type non-conductive organic polymers employed for reaction with the multisulfonic acid according to the invention include polyaniline, its naphthyl and biphenyl derivatives, and alkyl and aryl substituted polyaniline and its alkyl and aryl substituted naphthyl and biphenyl derivatives.

Such base-type non-conductive polymers can be represented as follows:

where A is an unsaturated carbon-containing group, such as aryl, particularly the benzene ring, as in polyaniline, and including naphthyl and biphenyl, and substituted benzene, naphthyl or biphenyl groups, such as the alkyl substituted derivatives, e.g., 2-methyl biphenyl, butyl naphthalene, 2-methyl aniline, and aryl substituted derivatives, e.g., beta phenyl naphthalene and beta tolyl naphthalene; and y is an integer ranging from about 1 to about 1,000, e.g., about 10 to about 100. When y is in the low end of the above range, e.g., when y is 1 or 2, the materials are known as oligomers and are intended to be included within the term "polymer" employed herein.

The preferred non-conductive polymer employed as the basic polymeric starting material is polyaniline emeraldine free-base (PFB). This is a high polymer having a molecular weight of the order of 50,000 to 80,000. Lower molecular weight forms of polyaniline can also be employed, such as an oligomer of polyaniline containing 8 aniline monomer units and having a molecular weight of about 800 to 900.

The multiprotic acids employed according to the invention are thermally stable organic multisulfonic acids, particularly aromatic multisulfonic acids having the formula $R(SO_3H)_n$, where R is aryl, such as benzene, naphthalene, substituted benzene and substituted naphthalene groups, such as phthalocyanine, and fused on benzene and napthalene groups, such as anthracene and pyrene groups, and n is an integer of at least 2, preferably 2 to 4. The preferred aromatic multisulfonic acids are benzene, naphthalene, phthalocyanine and pyrene multisulfonic acids. Specific examples are m-benzene disulfonic acid, o-benzene disulfonic acid, 1,6-naphthalene disulfonic acid, naphthalene trisulfonic acid, phthalocyanine tetrasulfonic acid, pyrene disulfonic acid, and pyrene trisulfonic acid. The above aromatic multisulfonic acids have low volatility and good stability, an important factor in producing conductive derivatized polyanilines, which are very stable to oxidation at elevated temperature.

Thus, for example, the reaction between polyaniline emeraldine free-base and m-benzene disulfonic acid can be represented as follows:

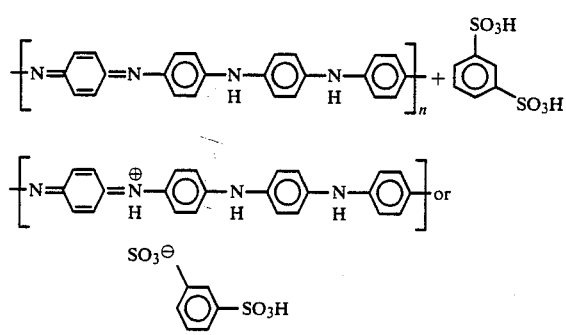

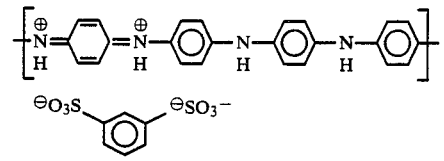

From the above reaction scheme, it is seen that the $-SO_3\ C_6H_4-SO_3H$ proton group is linked covalently to the N atoms of the polyaniline through the H bond. Thus, more broadly it is seen that $-SO_3R(SO_3H)_{n-1}$ groups of the aromatic multisulfonic acid are linked covalently to the N atoms of the polyaniline through the H bond, where R and n have the values noted above. Alternatively, the disulfonic acid groups in the above reaction can bind to two different polyaniline molecules as by cross linkage. Such possible cross linking depends on how the sulfonic acid groups are arranged on the organic molecule. For example, in pyrene disulfonic acid, if the $-S_3H$ groups are just on one side of the pyrene molecule, in all probability no cross linking occurs. However, in most cases, some cross linking will occur. Such cross linking may reduce the solubility of the resulting polymers somewhat, except particularly in the case of the phthalocyanine multisulfonic acids.

The thermal stability of the resulting conductive polymers is exceptionally high due to the low volatility and high thermal stability of the multisulfonic acids employed as derivatizing agents for the non-conductive polymer, e.g., polyaniline, resulting in sulfonic acid groups bound to the polymer backbone through nitrogen.

In place of polyaniline containing phenyl groups, as noted above, there can be employed other non-conductive base-type polymeric starting materials of the polyaniline family, containing naphthalene or biphenyl groups, the resulting conductive polymers thus produced according to the invention being analogous base-type conductive polymers containing naphthyl or biphenyl groups, respectively.

The invention will be described hereinafter, however, mostly in terms of the use of the preferred non-conductive free-base polyaniline as polymeric starting material for reaction with an aromatic multisulfonic acid for production of the preferred conductive polyaniline of high thermal stability described above.

In carrying out the reaction, the polyaniline free-base is treated with the aromatic multisulfonic acid, e.g., m-benzene disulfonic acid. If desired, a combination of aromatic multisulfonic acids can be reacted with the non-conductive polymer. Thus, for example, non-conductive polyaniline can be reacted with a mixture of m-benzene disulfonic acid and naphthalene disulfonic acid, in order to tailor the properties of the resulting conductive polymer, e.g., so as to have a desired electrical conductivity, together with high thermal stability.

The molar proportions of aromatic multisulfonic acid to non-conductive nitrogen-containing polymer free-base to produce an electrically conductive polymer according to the invention can vary and can range from about 1/16 to about 2 moles of multisulfonic acid per nitrogen of each polymer unit, and in the case of polyaniline, from about ⅛ to about 2 moles of multisulfonic acid, for every two aniline units in the polyaniline chain.

The reaction can be carried out as a heterogeneous reaction wherein the polymer starting material is not dissolved but is reacted with the aromatic multisulfonic acid in aqueous medium, since most of the multisulfonic acid reactants hereof are soluble in water although the polymer starting material is not. However, phthalocyanine tetrasulfonic acid and certain of the other multisulfonic acids hereof are soluble in organic solvents, such as N-methyl pyrrolidone, formic acid, and acetic acid, and hence the reaction employing such derivatizing agents can be carried out in such solvents.

The reaction is generally carried out at about ambient or room temperature, e.g., 20°–25° C., or at higher or lower temperatures, and preferably at ambient or atmospheric pressure.

The rate of reaction can range widely, depending on the particular multisulfonic acid reactant employed. Thus, the reaction rate can range from almost instantaneous to several hours or longer.

The resulting conductive polymer has high conductivity, ranging from about 0.2 to about 10 S/cm, and has high thermal stability and remains electrically conductive at elevated temperature, e.g., at 150° C. to 180° C. in air over an extended time period.

The physical properties of the highly conductive polymer produced according to the invention can be varied, so as to enhance the thermal stability, e.g., by increasing the number of —$SO_3H$ groups on the multisulfonic acid reactant.

The high oxidative and thermal stability of the derivatized conductive polymers, e.g., conductive polyaniline, produced according to the invention as compared to other conductive polyaniline polymers is shown in the drawing. FIG. 1 of the drawings shows the relative decomposition rates for (a) polyaniline derivatized with m-benzene disulfonic acid, (b) polyaniline derivatized with p-toluene solfonic acid, and (c) polyaniline derivatized with tosyl chloride, at 180° C. in air. The decomposition of polyaniline derivatized with various acids in this figure is followed by studying the decrease in the precent of the original 800 nm absorption of polyaniline over time. The 800 nm absorption ordinate of the plot in FIG. 1 of the drawings correlates with polyaniline's electrical conductivity. The plot shows the substantial increase in stability over an extended period of time at 180° C. of the conductive polyaniline derivatized with m-benzene disulfonic acid, as indicated by curve (a), according to the invention as compared to the thermal stability of polyaniline derivatized with the other two compounds noted above and indicated by curves (b) and (c), respectively, over the same period of time at 180° C.

Figure 2:
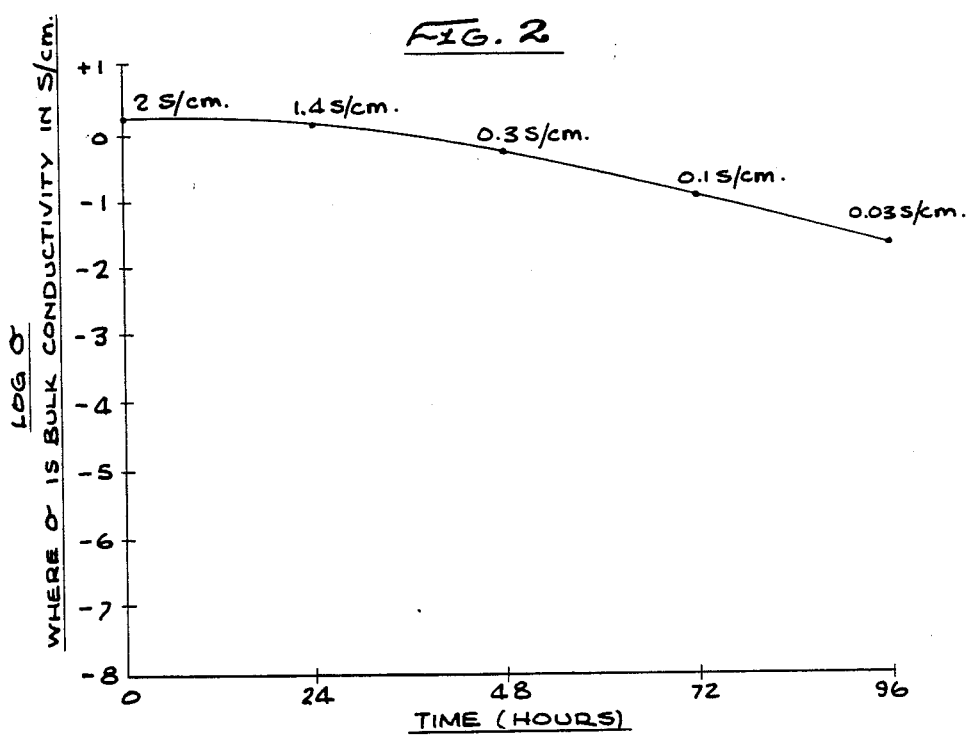
FIG. 2 shows the slow drop in bulk conductivity of polyaniline derivatized with m-benzenedisulfonic acid when heated at 180° C. in air.

FIG. 2 shows the slow decrease in conductivity of polyaniline derivatized with m-benzene disulfonic acid heated at 180° C. in air. The plot shows that the polymer loses its conductivity only slowly and only after several days.

The following are examples of practice of the invention.

EXAMPLE 1

Five grams of polyaniline emeraldine free-base is dispersed in 200 ml of distilled water containing o-benzene disulfonic acid in an amount sufficient to provide one molecule of acid for every two aniline units on the polyaniline backbone. The solution is then stirred for 12 hours at room temperature (20°–25° C.) and at atmospheric pressure. After this, the solution is filtered, the precipitate of derivatized polyaniline is washed with 100 ml of distilled water and is dried under vacuum. A pressed pellet is then formed from the precipitate. Bulk conductivity measurement of the pellet is made, showing a conductivity of 2 S/cm.

EXAMPLE 2

The procedure of Example 1 is carried out using 1,6 naphthalene disulfonic acid as derivatizing agent. The resulting conductive polymer has a conductivity of 1.3 S/cm.

EXAMPLE 3

The procedure of Example 1 is carried out using naphthalene trisulfonic acid as derivatizing agent. The resulting conductive polymer has a conductivity of 3.5 S/cm.

EXAMPLE 4

The procedure of Example 1 is carried out using pyrene trisulfonic acid as derivatizing agent. The resulting conductive polymer has a conductivity of 1 S/cm.

EXAMPLE 5

The procedure of Example 1 is carried out using phthalocyanine tetrasulfonic acid as derivatizing agent. The resulting conductive polymer has a conductivity of 0.16 S/cm.

EXAMPLE 6

5 grams of emeraldine free-base is reacted with 6.5 grams of m-benezene disulfonic acid in 200 mls of formic acid at ambient temperature and pressure.

A highly thermally stable conductive polymer is formed upon evaporation of the formic acid. This polymer loses its conductivity only very slowly after several days at 180° C. in air, as shown by the plot in FIG. 2 of the drawing. The oxidative thermal stability of this conductive polyaniline shown by curve (a) in FIG. 1 is much higher than conductive polyanilines of the prior art, as shown by curves (b) and (c) in FIG. 1 of the drawing.

EXAMPLE 7

5 grams of emeraldine free-base is reacted with 5 grams of phthalocyanine tetrasulfonic acid in 200 mls of formic acid at ambient temperature and pressure.

A highly thermally stable conductive polymer is formed upon evaporation of the formic acid.

The base-type electrically conductive highly thermally stable polymers of the invention have utility in the production of conductive composites, electronic components, electrical conductors, electrodes, batteries, switches, electrical shielding material, resistors, capacitors, and the like.

From the foregoing, it is seen that the invention provides a class of novel conductive polymer materials prepared by reacting a multiprotic acid in the form of an aromatic multisulfonic acid, with a non-conductive polymer, particularly base-type polymers, such as polyaniline, thus stabilizing the polymer backbone to oxidation at high temperature. The resulting conductive polymers accordingly have high thermal stability and can be readily prepared. These properties render the polymers of the invention particularly useful in aerospace applications for conductive polymers requiring continuous use at high temperatures, e.g., 180° C. up to 250° C.

While particular embodiments of the invention have been described for purposes of illustration, it will be understood that various changes and modifications within the spirit of the invention can be made, and the invention is not to be taken as limited except by the scope of the appended claims.

What is claimed is:

1. A process for producing a conductive polymer which comprises reacting a base-type non-conductive polymer containing carbon-nitrogen linkages and selected from the group consisting of polyaniline, its naphthyl and biphenyl derivatives, and alkyl and aryl substituted polyaniline and its alkyl and aryl substituted napthhyl and biphenyl derivatives, with an effective amount sufficient to increase electrical conductivity, of an aromatic multisulfonic acid having the formula $R(SO_3H)_n$, where R is aryl and n is an integer of at least 2, and forming a conductive polymer containing $-SO_3H$ groups covalently linked to the nitrogen atoms of said conductive polymer through the H bond.

2. The process of claim 1, wherein n is 2 to 4.

3. The process of claim 1, wherein said aromatic multisulfonic acid is a member selected from the group consisting of benzene, naphthalene, phthalocyanine and pyrene multisulfonic acids.

4. The process of claim 1, wherein said aromatic multisulfonic acid is selected from the group consisting of m-benzene disulfonic acid, o-benzene disulfonic acid, 1,6naphthalene disulfonic acid, naphthalene trisulfonic acid, phthalocyanine tetrasulfonic acid, pyrene disulfonic acid, and pyrene trisulfonic acid.

5. The process of claim 1, wherein said base-type non-conductive polymer is polyaniline.

6. The process of claim 5, wherein said aromatic multisolfonic acid is a member selected from the group consisting of benzene, naphthalene, phthalocyanine and pyrene multisulfonic acids, and wherein n is 2 to 4.

7. The process of claim 5, wherein said aromatic multisulfonic acid is selected from the group consisting of m-benzene disulfonic acid, o-benzene disulfonic acid, 1,6naphthalene disulfonic acid, naphthalene trisulfonic acid, phthalocyanine tetrasulfonic acid, pyrene disulfonic acid, and pyrene trisulfonic acid.

8. The process of claim 1, wherein said aromatic multisulfonic acid is soluble in water, and said reaction is carried out in an aqueous medium.

9. The process of claim 1, wherein said aromatic multisulfonic acid is soluble in an organic solvent, and said reaction is carried out in an organic solvent.

10. The process of claim 1, wherein said reaction is carried out heterogeneously.

11. The process of claim 7, wherein said reaction is carried out in an aqueous medium.

12. The process of claim 1, wherein the molar proportions of said aromatic multisulfonic acid to said base-type non-conductive polymer cna range from about 1/16 to about 2 moles of multisulfonic acid per nitrogen of each polymer unit.

13. The process of claim 5, wherein the molar proportion of aromatic multisulfonic acid to said polyaniline ranges from about 1/8 to about 2 moles of multisulfonic acid for every two aniline units in the polyaniline chain.

14. The process of claim 1, wherein said reaction is carried out at a temperature ranging from about 20° to about 25° C. and at atmospheric pressure.

15. A process for producing a conductive polymer which comprises reacting a base-type non-conductive polymer containing carbon-nitrogen linkages and having the formula

where A comprises an aryl gorup and y is an integer ranging from about 1 to about 1,000, with an effective amount sufficient to increase electrical conducitivity, of an aromatic multisulfonic acid having the formula $R(SO_3H)_n$, where R is aryl and n is an integer of 2 to 4, and forming a conductive polymer containing $-SO_3H$ groups covalently linked to the nitrogen atoms of said conductive polymer through the H bond.

16. An electrically conductive polymer comprising a base-type polymer containing carbon-nitrogen linkages and selected from the group consisting of polyaniline, its naphthyl and biphenyl derivatives, and alkyl and aryl substituted polyaniline and its alkyl and aryl substituted naphthyl and biphenyl derivatives, said polymer having an aromatic multisulfonic acid group covalently linked to nitrogen atoms of said polymer through the H bond, and wherein said aromatic multisulfonic acid group is $-SO_3R(SO_3H)_{n-1}$, where R is aryl and n is an integer of at least 2.

17. The electrically conductive polymer of claim 16, wherein said base-type non-conductive polymer is polyaniline.

18. The electrically conductive polymer of claim 16, wherein R is selected from the group consisting of benzene, naphthalene, phthalocyanine and pyrene and n is an integer of from 2 to 4.

19. The electrically conductive polymer of claim 16, wherein said aromatic multisulfonic acid group is derived from an aromatic multisulfonic acid selected from the group consisting of m-benzene disulfonic acid, o-benzene disulfonic acid, 1,6- naphthalene disulfonic acid, naphthalene trisulfonic acid, phthalocyanine tetrasulfonic acid, pyrene disulfonic acid, and pyrene trisulfonic acid.

20. The electrically conductive polymer of claim 16, wherein said base-type polymer is polyaniline.

21. The electrically conductive polymer of claim 19, wherein said base-type polymer is polyaniline.

* * * * *